United States Patent
Aida et al.

(10) Patent No.: US 8,423,915 B2
(45) Date of Patent: Apr. 16, 2013

(54) TERMINAL DEVICE, CONTENT DISPLAYING METHOD, AND CONTENT DISPLAYING PROGRAM

(75) Inventors: Satoshi Aida, Tokyo (JP); Noboru Takahashi, Tokyo (JP); Koji Matsuzawa, Ayase (JP); Ohki Chiba, Tokyo (JP)

(73) Assignee: Access Co., Ltd., Tokyo (JP)

( * ) Notice: Subject to any disclaimer, the term of this patent is extended or adjusted under 35 U.S.C. 154(b) by 839 days.

(21) Appl. No.: 12/375,520

(22) PCT Filed: Jul. 23, 2007

(86) PCT No.: PCT/JP2007/064403
§ 371 (c)(1),
(2), (4) Date: Jul. 31, 2009

(87) PCT Pub. No.: WO2008/013127
PCT Pub. Date: Jan. 31, 2008

(65) Prior Publication Data
US 2009/0312064 A1    Dec. 17, 2009

(30) Foreign Application Priority Data
Jul. 28, 2006  (JP) .................. 2006-206287

(51) Int. Cl.
*G06F 3/048* (2006.01)

(52) U.S. Cl.
USPC .......... 715/862; 715/814; 715/844; 715/856; 715/864

(58) Field of Classification Search .................. 715/814, 715/844, 856–858, 862, 864; 455/565
See application file for complete search history.

(56) References Cited

U.S. PATENT DOCUMENTS

| | | | |
|---|---|---|---|
| 6,657,647 B1 * | 12/2003 | Bright | 715/856 |
| 7,197,718 B1 * | 3/2007 | Westerman et al. | 715/801 |
| 7,336,279 B1 * | 2/2008 | Takiguchi | 345/473 |
| 7,559,034 B1 * | 7/2009 | Paperny et al. | 715/803 |
| 2004/0239686 A1 * | 12/2004 | Koyama et al. | 345/620 |
| 2006/0111634 A1 * | 5/2006 | Wu | 600/443 |
| 2006/0291738 A1 * | 12/2006 | Gong | 382/254 |
| 2007/0234206 A1 * | 10/2007 | Yamabuchi et al. | 715/526 |
| 2008/0059906 A1 * | 3/2008 | Toki | 715/810 |

FOREIGN PATENT DOCUMENTS

| | | |
|---|---|---|
| JP | 4-76724 A | 3/1992 |
| JP | 2005-316558 A | 11/2005 |

OTHER PUBLICATIONS

International Search Report mailed Oct. 9, 2007, for PCT Application No. PCT/JP2007/064403 filed Jul. 23, 2007, 6 pages.
Mainichi Communications Inc. (May 2005). "Kojin Joho Hogoho Jidai No Roei Boshi Manual Lock Kino De, Tanin Ga Tsukaenai Yoni Suru [Manual of Leakage Prevention for the Era of Personal Information Protection Law—Use by Another Person is Prevented with Locking Function]," *PC Mode* 116:70-71.
Japanese Office Action received for Japanese Patent Application No. 2008-526751, mailed on Jan. 15, 2013, 4 pages (2 pages of English Translation and 2 pages of Office Action).

* cited by examiner

*Primary Examiner* — Tadeese Hailu
(74) *Attorney, Agent, or Firm* — Morrison & Foerster LLP

(57) ABSTRACT

Provided is a terminal device including: operation means for receiving an input operation by a user; non-operation detection means for detecting whether a non-operation state in the operation means has continued for a predetermined period of time; and icon display means used when it is detected that the non-operation state has continued for the predetermined time, for shifting to another mode different from the current mode and displaying an icon corresponding to the new mode.

29 Claims, 11 Drawing Sheets

(c)

(b)

(a)

(a)

(b)

TERMINAL DEVICE, CONTENT DISPLAYING METHOD, AND CONTENT DISPLAYING PROGRAM

FIELD OF THE INVENTION

The present invention relates to a terminal device, a content displaying method, and a content displaying program that analyzes content data and displays content in a display based on the analyzed result.

BACKGROUND OF THE ART

Recently, due to rapid popularization of networks represented by the Internet and its technology developments, the user has become able to browse information in the network using not only PCs (Personal Computers) such as a desktop PCs and laptop PCs, but also various information terminals such as mobile phones, PDAs (Personal Digital Assistances), consumer electronics, and car navigation devices. The information browsing software (Hereinafter, "browser".) is installed in these information terminals. The browser parses a document described in a markup language, for example, HTML (Hyper Text Markup Language), and then, performs a layout making processing based on the parsed result. Thereby, the information on the network (e.g., page) is displayed (i.e., rendered) on the display of the terminal.

First, the terms used in this application are defined.
Network:
  The "network" includes various kinds of communications network including a carrier telecommunications network, an intranet, and the Internet.
Content:
  The "content" is a set of information that the user views, including video, image, music or text, or their combinations, which is transmitted via a network or stored in a terminal.
Web Content:
  The "web content" is a form of the content, and a set of information transmitted via a network.
Web Page (or Simply, "page"):
  The "web page" (or simply, "page") is a form of web content, and is the whole content that is to be displayed when the user designated a particular URI (Uniform Resource Identifier). In other words, it means the whole content that can be displayed by scrolling the image on the display. It is noted that a web page includes not only a page for browsing online but also a page for browsing offline. The web page for browsing offline includes, for example, pages transmitted via the Internet and cached by the browser, and pages saved in a "mht" format in places such as a local folder in a terminal device. The web page consists of various kinds of data such as a HTML document, an image file, and voice data.

In accordance with the above definition, "content" encompasses "web content", and "web content" encompasses "web page" and "page".

The screen size of mobile terminals such as mobile phones is extremely small compared with, for example, desktop PCs. Therefore, when displaying, for example, a whole page in one screen in such a browser of a mobile phone, the displaying size of, for example, text and image included in the page becomes small, and its visibility becomes poor. Specially, when displaying pages created assuming, for example, desktop PCs, in a mobile terminal, the poor visibility becomes more serious.

As a function for improving the visibility of a page, mobile phone browsers may be implemented with a zoom function that displays the page in a magnified way. For example, a Japanese Patent Provisional Publication No. JP2005-316558A discloses a mobile phone capable of zooming in a desired portion in a page with a simple operation.

DISCLOSURE OF THE INVENTION

In accordance with the mobile phone described in JP2005-316558A, a key operation is needed to transfer from a mode into a magnifying mode. By means of the user operating to select, for example, an icon for the magnifying mode in the menu, the mode of the mobile phone is enabled to be transferred into the magnifying mode.

Accordingly, in view of the above circumstances, an object of the present invention is to provide a terminal device capable of reducing such operation load of the user. Further, it is also an object of the invention to provide a content displaying method and a content displaying program suitable for reducing the operation load of the user.

In order to resolve the above described problems, in accordance with an embodiment of the invention, there is provided a terminal apparatus for analyzing content data and displaying content in a display based on the analyzed result, comprising: an operation means for accepting input operation of a user; a non-operation detecting means for detecting whether a non-operating state of the operation means has continued for a predetermined period or not; and an icon displaying means for transferring into a mode other than a current mode and for displaying an icon corresponding to the transferred mode, when it is detected that the non-operating state continued for a predetermined period.

In accordance with the terminal apparatus so arranged, for example, the need to perform selection operation for an menu item for transferring into another mode is eliminated, and thereby the load of the user is reduced.

The above terminal apparatus may further comprise: a pointer displaying means for displaying in a first mode, a pointer which is movable with the input operation and is for selecting an anchor link included in the content; a pointer location monitoring means for monitoring location of the pointer; and a proximity determining means for determining whether the pointer comes in proximity to the anchor link or not, based on the monitoring result of the pointer location monitoring means and the analyzed result. The terminal apparatus so arranged operates such that, when it is determined that the pointer comes in proximity to the anchor link, the anchor link is set focus on.

In this case, the non-operation detecting means does not perform a detecting process while the focus is set on.

The above terminal apparatus operates such that, the icon displaying means displays a second mode transferring icon for transferring from the first mode to a second mode, when the non-operation detecting means detects that the non-operating state has continued for a predetermined period while in the first mode, and the terminal apparatus transfers into the second mode when the operation means performs selection operation for the second mode transferring icon.

The above terminal apparatus may further comprise, an indicator displaying means for displaying in the second mode, an indicator that allocates in a first direction in array a plurality of zoom/pan ratio setting icons for setting displaying zoom/pan ratio for the content and which allocates in a second direction in array a plurality of mode-setting icons for setting the mode. The first direction and the second direction may be perpendicular to each other. By assigning different functions for icons allocated in arrays in different directions, switching of various displaying forms is easily done.

The indicator displaying means may operate such that it displays all of the zoom/pan ratio setting icons all the time in the second mode, and displays in a line the mode-setting icons adjacent to the zoom/pan ratio setting icon that is in a state of drawing attention among the zoom/pan ratio setting icons.

The above terminal apparatus may further comprise, a displaying area superposing means for superposedly-displaying onto the content in the second mode, displaying area information that represents the displaying area when the displaying zoom/pan ratio of the content is unchanged zoom/pan ratio.

The above terminal apparatus may further comprise, a content width acquiring means for acquiring content width information based on the analyzed result. The terminal apparatus so arranged operates such that, when selection operation for a first zoom/pan ratio setting icon among the plurality of zoom/pan ratio setting icons is performed, the content is displayed in zoom/pan ratio in which the width of the content and the width of the displaying area of the display becomes the same.

The above terminal apparatus may further comprise, a content capturing means for capturing each of the content displayed in the display and for storing it associating with its displayed time information. The terminal apparatus so arranged operates such that, when a second zoom/pan ratio setting icon is selected among the plurality of zoom/pan ratio setting icons, each of the captured content is displayed while being located in time sequence based on the display time information.

The above terminal apparatus may further comprise, a frame determining means for determining whether the content is frame content or not based on the analyzed result. It may operate such that, when it is determined that the content is frame content, the indicator displaying means allocates in an array an informing icon informing as such in the second direction of the indicator.

The above terminal apparatus may further comprise, a frame changing means for changing the displaying form of the frame content, when the location of the informing icon is moved with operation using the operation means.

It may operate such that, the frame changing means displays a plurality of content included in the frame content when the informing icon is in a first location, and displays single content included in the frame content when the informing icon is in a second location that is located opposite side of the indicator to the first location.

The above terminal apparatus may further comprise: a whole displaying means for displaying the whole content on one screen by reducing; an area selecting means for selecting an arbitrary area in the content reduction displayed; and an area enlarging means for enlarging the selected area in substantially whole area of the display.

It may be arranged such that, when selection operation for either of the plurality of mode-setting icons is performed, the indicator displaying means displays in array in the second direction, icons for setting parameter in the mode corresponding to the selected mode-setting icon.

Further, in order to resolve the above described problems, in accordance with another embodiment of the invention, there is provided a terminal apparatus capable of displaying content, comprising: an operation means for accepting input operation of a user; a non-operation detecting means for detecting whether a non-operating state of the operation means has continued for a predetermined period or not; and an icon displaying means for displaying an icon for transferring into certain mode, when it is detected that the non-operating state has continued for a predetermined period; and wherein when selection operation for the icon is performed with the operation means, the terminal device transfers into the certain mode.

Furthermore, in order to resolve the above described problems, in accordance with another embodiment of the invention, there is provided a terminal apparatus capable of displaying content, comprising: an operation means for accepting input operation of a user; a non-operation detecting means for detecting whether a non-operating state of the operation means has continued for a predetermined period or not; and an icon circulating-displaying means for displaying circulatingly each of the plurality of icons each for transferring into a different mode, each time the non-operating state continuing for a predetermined period is detected; and wherein when selection operation for the icon is performed with the operation means, the terminal device transfers into the mode associated to the icon.

In order to resolve the above described problems, in accordance with an embodiment of the invention, there is provided a content displaying method for analyzing content data and displaying content in a display based on the analyzed result, comprising: an operating step for accepting input operation of a user; a non-operation detecting step for detecting whether a non-operating state in the operating step has continued for a predetermined period or not; and an icon displaying step for transferring into a mode other than a current mode and for displaying an icon corresponding to the transferred mode, when it is detected that the non-operating state continued for a predetermined period.

In accordance with such a content displaying method, for example, the need to perform selection operation for an menu item for transferring into another mode is eliminated, and thereby the load of the user is reduced.

The above content displaying method may further comprise: a pointer displaying step for displaying in a first mode, a pointer which is movable with the input operation and is for selecting an anchor link included in the content; a pointer location monitoring step for monitoring location of the pointer; and a proximity determining step for determining whether the pointer came in proximity to the anchor link or not, based on the monitoring result of the pointer location monitoring step and the analyzed result. In this case, when it was determined that the pointer comes in proximity to the anchor link, the anchor link is set focus on. The detecting process in the non-operation detecting step is not performed while the focus is set on.

The above content displaying method operates such that, a second mode transferring icon for transferring from the first mode to a second mode is displayed in the icon displaying step, when the non-operating state continuing for a predetermined period while in the first mode was detected, and the method transfers into the second mode when selection operation for the second mode transferring icon was performed.

The above content displaying method may further comprise, an indicator displaying step for displaying in the second mode, an indicator that allocates in a first direction in array a plurality of zoom/pan ratio setting icons for setting displaying zoom/pan ratio for the content and which allocates in a second direction in array a plurality of mode-setting icons for setting the mode. By assigning different functions for icons allocated in arrays in different directions, switching of various displaying forms is easily done.

In the indicator displaying step, for example, all of the zoom/pan ratio setting icons are displayed all the time, and the mode-setting icons are displayed in a line adjacent to the zoom/pan ratio setting icon that is in a state of drawing attention among the zoom/pan ratio setting icons.

The above content displaying method may further comprise, a displaying area superposing step for superposedly-displaying onto the content in the second mode, displaying area information that represents the displaying area when the displaying zoom/pan ratio of the content is unchanged zoom/pan ratio.

The above content displaying method may further comprise, a content width acquiring step for acquiring content width information based on the analyzed result. In this case, when selection operation for a first zoom/pan ratio setting icon among the plurality of zoom/pan ratio setting icons is performed, the content is displayed in zoom/pan ratio in which the width of the content and the width of the displaying area of the display becomes the same.

The above content displaying method may further comprise, a content capturing step for capturing each of the content displayed in the display and for storing it associating with its display time information. In this case, when a second zoom/pan ratio setting icon is selected among the plurality of zoom/pan ratio setting icons, each of the captured content is displayed locating in time sequence based on the display time information.

The above content displaying method may further comprise, a frame determining step for determining whether the content is frame content or not based on the analyzed result. In this case, when it is determined that the content is frame content, an informing icon informing as such is allocated in an array in the second direction of the indicator.

The above content displaying method may further comprise, a frame changing step for changing the displaying form of the frame content, when the location of the informing icon is moved.

In the frame changing step, it may operate such that, a plurality of content included in the frame content is displayed when the informing icon is in a first location, and single content included in the frame content is displayed when the informing icon is in a second location that is located opposite side of the indicator to the first location.

The above content displaying method may further comprise: a whole displaying step for displaying the whole content on one screen by reducing; an area selecting step for selecting an arbitrary area in the content reduction displayed; and an area enlarging step for enlarging the selected area in substantially whole display.

The above content displaying method may operate such that, when selection operation for either of the plurality of mode-setting icons is performed, icons for setting parameter in the mode corresponding to the selected mode-setting icon are displayed in an array in the second direction.

Further, in order to resolve the above described problems, in accordance with another embodiment of the invention, there is provided a content displaying method for displaying content, comprising: an operating step for accepting input operation of a user; a non-operation detecting step for detecting whether a non-operating state of the operating step has continued for a predetermined period or not; an icon displaying step for displaying an icon for transferring into certain mode, when it is detected that the non-operating state continued for a predetermined period; and a mode transferring step for transferring into the certain mode, when selection operation for the icon is performed.

Furthermore, in order to resolve the above described problems, in accordance with another embodiment of the invention, there is provided a content displaying method for displaying content, comprising: an operating step for accepting input operation of the user; a non-operation detecting step for detecting whether a non-operating state in the operating step has continued for a predetermined period or not; an icon circulating-displaying step for displaying circulatingly each of the plurality of icons each for transferring into a different mode, each time the non-operating state continuing for a predetermined period is detected; and a mode transferring step for transferring into a mode associated with the icon, when selection operation for the icon is performed.

In order to resolve the above described problems, in accordance with another embodiment of the invention, there is provided a content displaying program for enabling a computer to execute the above content displaying methods.

BRIEF DESCRIPTION OF ACCOMPANYING DRAWINGS

DETAILED DESCRIPTION OF PREFERRED EMBODIMENTS

Figure 1:
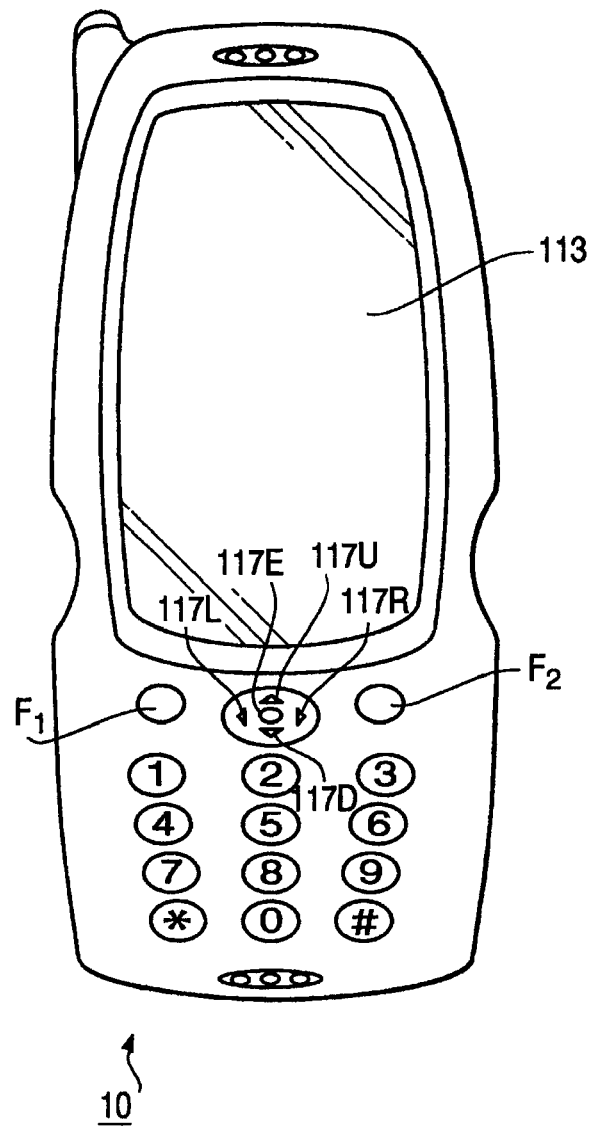
FIG. 1 is a diagram showing an exterior view of a terminal device according to an embodiment of the invention.

In the following, embodiments of the invention will be described referring to the drawings.

Figure 2:
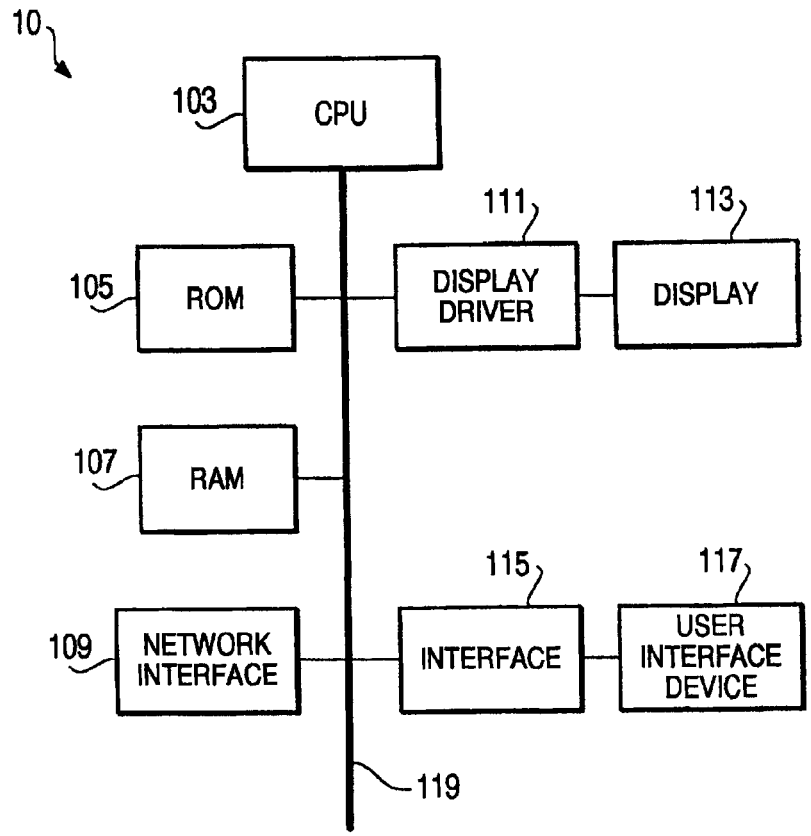
FIG. 2 is a block diagram showing an arrangement of a terminal device according to an embodiment of the invention.

FIG. 1 is a diagram showing an exterior view of a terminal device 10 according to an embodiment of the invention. FIG. 2 is a block diagram showing an arrangement of the terminal device 10 according to an embodiment of the invention. In this embodiment of the invention, the terminal device 10 is a mobile phone, but in other embodiments of the invention, various kinds of form can be assumed, for example, PCs such as desktop PCs and laptop PCs, mobile phones, PDAs, and PHS (Personal Handy phone System).

The terminal device 10 includes a CPU 103 that controls integrally thereof. The CPU 103 is connected to components via a bus 119. Those components include a ROM (Read-Only Memory) 105, a RAM (Random-Access Memory) 107, a network interface 109, a display driver 111, and an interface 115. The display driver 111 and the interface 115 are connected to a display 113 and a user interface device 117, respectively.

Various kinds of programs and data are stored in the ROM 105. The program stored in the ROM 105 is, for example, a browser 50. The browser 50 is an information browsing software for browsing online or offline information described in predetermined markup languages.

The RAM 107 is an extracting destination for various kinds of programs stored in the ROM 105. According to the user operation using the user interface device 117 (Hereinafter, it is simply described as "user operation".), the program stored in the ROM 105 (e.g., the browser 50) is read and extracted to certain areas in the RAM 107, and then executed. Thereby, the browser 50 starts running.

The user interface device 117 includes a 5-way key and function keys F1 and F2. The 5-way key consists of four direction keys 117U, 117D, 117R and 117L and an enter key 117E.

In the following, functions of the browser 50 are described. A browser engine 30, which is a basic component of the browser 50, is described referring to FIG. 3.

Figure 3:
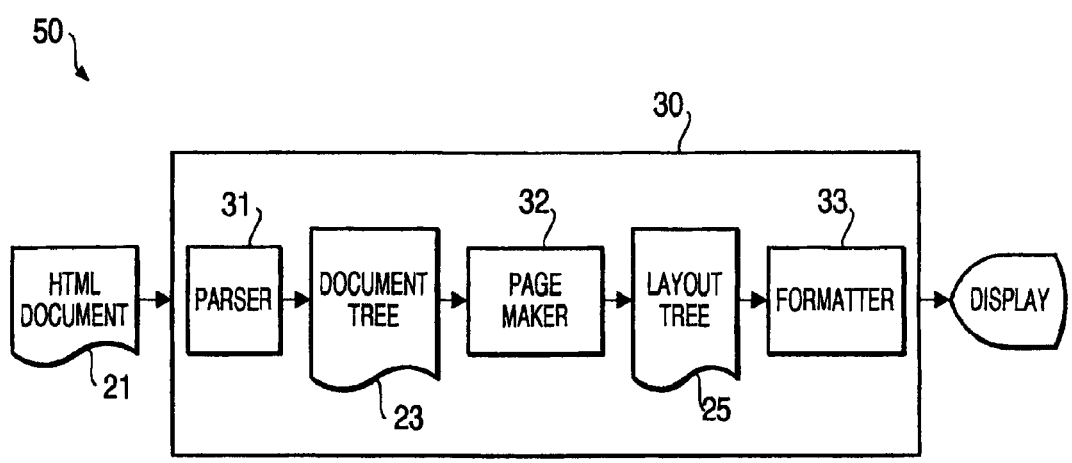
FIG. 3 is a functional block diagram of a browser engine included in a browser according to an embodiment of the invention.

FIG. 3 is a functional block diagram of the browser engine 30 included in the browser 50. As shown in FIG. 3, the browser engine 30 is provided with functional blocks including a parser 31, a page maker 32 and a formatter 33.

When a URI is input via a user operation (or alternatively, when a URI is designated by selecting an anchor tag included in the web page, or when a URI that was held internally in the terminal device 10 as a bookmark or a history log, is selected), the browser 50 operates to acquire a HTML document 21 (i.e., the requested page) from the URI (e.g., a server) in the Internet.

The server sends out a HTML document 21 in response to the request made by the browser 50. The sent out HTML document 21 is then, passed to the parser 31 via a certain network and a network interface 109.

The parser 31 parses this HTML document 21, and creates a document tree 23 that shows the syntax structure of the HTML document 21 in a tree structure. It is noted that the document tree 23 only shows the syntax structure of the HTML document 21 and does not include information related to expressions in the document.

Then, the page maker 32 creates a layout tree 25 including expression formats, for example, "block", "inline", "table", "list" and "item", in the HTML document 21, based on information associated with the document tree 23 and the tags. In other words, a layout tree 25 includes information related to an ordering of, for example, "block", "inline", and "table". The layout tree 25 does not include information regarding positions in the screen and size corresponding to their elements (e.g., "block", "inline", and "table").

The formatter 33 executes a well-known formatting based on information of the layout tree 25 and the specification of the mobile device 10, and makes a layout for each elements (e.g., text and image) in the screen of the display 113. Following the above process carried out by the parser 31, the page maker 32 and the formatter 33, then the HTML document 21, i.e., the requested page, is displayed on the display 113.

Figure 4:
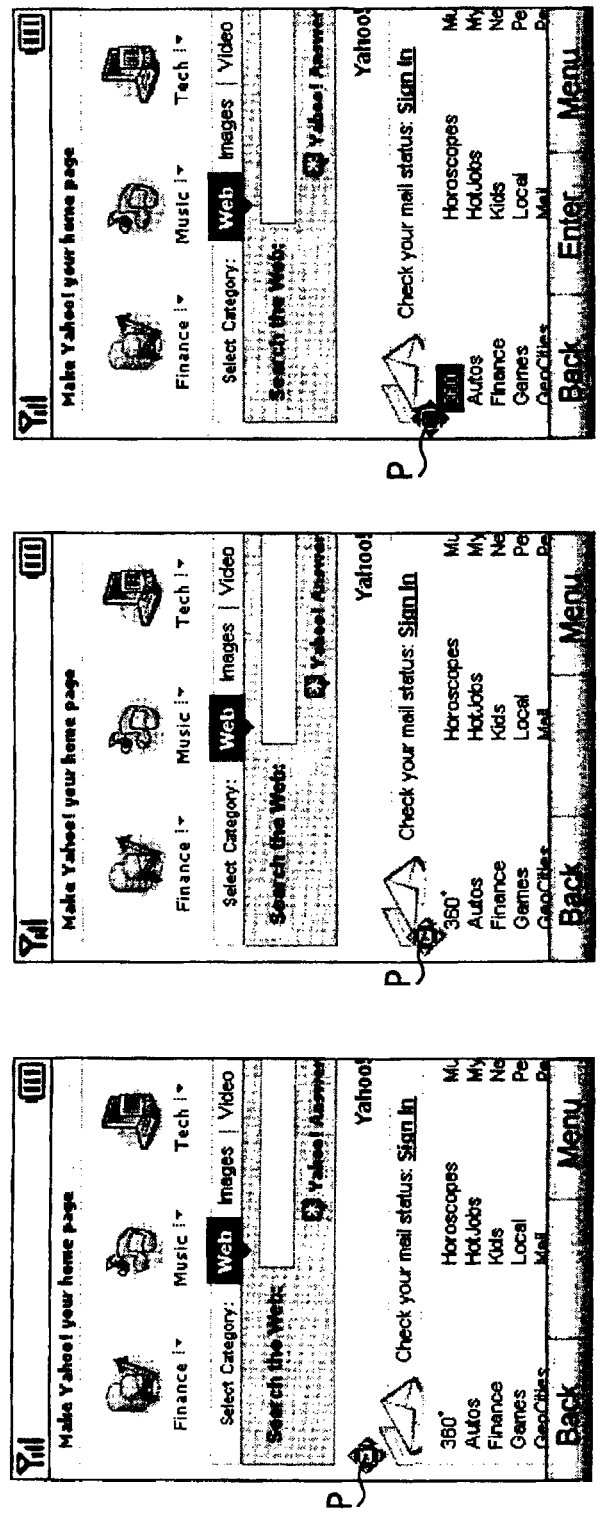
FIG. 4 is a diagram showing an example of a page displayed in a browser according to an embodiment of the invention.

FIGS. 4(a)-(c) show examples of a page displayed in the browser 50. This page is created assuming the displays of, for example, desktop PCs (e.g., XGA (eXtended Graphics Array)). In contrast, the display 113 is of, for example, QVGA (Quarter Video Graphics Array). In this embodiment of the invention, the formatter 33 has not performed a formatting, which is for adjusting to the number of pixels of the display 113 (e.g., folding of texts adjusting to the number of pixels in the screen width). Therefore, as shown in FIGS. 4(a)-(c), the page is not fit in the displaying area in the display 113 and only a part of the page is displayed.

As shown in FIGS. 4(a)-(c), a pointer P is displayed in the display 113. The pointer P moves inside of the display area of the display 113 according to the user operation using direction keys. In the present embodiment of the invention, a state when the pointer P is displayed is called "pointer mode".

For example, there are following ways to transfer from a mode (or, a state when not in any mode) into a pointer mode:
(1) Waiting for several seconds, and
(2) Selecting menu.

<(1) Waiting for Several Seconds>

Figure 12:
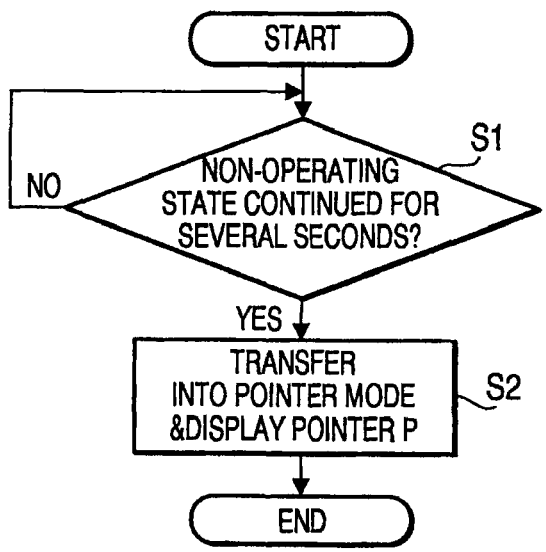
FIG. 12 is a flowchart showing a pointer mode transition process according to an embodiment of the invention.

FIG. 12 shows a flowchart of a pointer-mode-transferring process according to an embodiment of the invention adopting "(1) Waiting for several seconds". As shown in FIG. 12, for example, when several seconds of duration period in which there were no user operation input was detected since a page was displayed in the display (i.e., a period in which the pointer P was not displayed and no user operation was executed.) has passed (step 1. Hereinafter, in this application, "step" is abbreviated as "S".), the browser 50 transfers into a pointer mode displaying the pointer P in the page superposed. The waiting time period required for the transition to the pointer mode may be set, for example, via user operation.

<(2) Selecting Menu>

If a "Menu" button in lower right in the screen was selected by user operation while a page had been displaying, the browser 50 displays a menu as a pop-up form, for example, in front side of the page. The pop-up menu includes menu items for transferring into the pointer mode. When a menu item was selected by user operation, the browser 50 displays the pointer P superposed in the page, and transfers into the pointer mode. It is noted that, when a function key F1 was pressed, a button in lower left in the screen ("Back" in FIG. 4(a), etc.) is selected and the corresponding process will be executed. Further, when a function key F2 was pressed, a button in lower right in the screen (Herein, "Menu".) is selected and the corresponding process will be executed.

If a direction key 117D was pressed in FIG. 4(a), the pointer P moves downwards as shown in FIG. 4(b). If the direction key 117D was pressed more (or continued to be pressed), the pointer P moves downwards further to reside in the proximity of an anchor link captioned "360°", as shown in FIG. 4(c).

The browser 50 already knows the location of each of the items included in the displaying page in the display 113, and the location of the pointer P. Further, location information for each of the items is acquired from the parsed result of the browser engine 30. Furthermore, location information of the pointer P is cached in a memory such as a RAM 107, for example, by means of the browser 50, the CPU 103 and the user interface device 117 cooperating with each other.

The browser 50 refers to the known location information while in the pointer mode, and monitors whether the pointer P came in the proximity of either of the items included in the page or not. Then, when it was detected that the pointer P came in the proximity of either of the items, the browser 50 sets a focus on the item (i.e., the item will be set the focus on.). In FIG. 4(c), a "360°" anchor link is set the focus on.

As shown in FIG. 4(c), when either of the items included in the page was set the focus on, "Enter" is captioned on the button in lower center in the screen. If the user pressed the enter key 117E in this situation, the browser 50 sends a request for acquiring, for example, a page, to the URI associated with the "360°" anchor link. It is noted that, when the enter key 117E was pressed, the button in lower center in the screen ("Enter" in FIG. 4(c)) is selected and the corresponding process will be executed.

Figure 5:
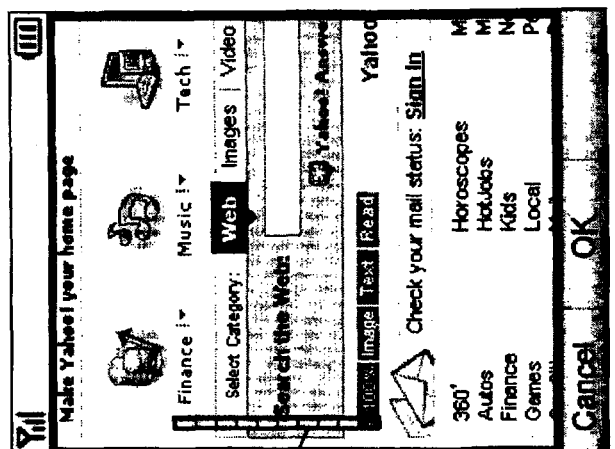
FIG. 5 is a diagram showing an example of a page displayed in a browser according to an embodiment of the invention.
Figure 5:
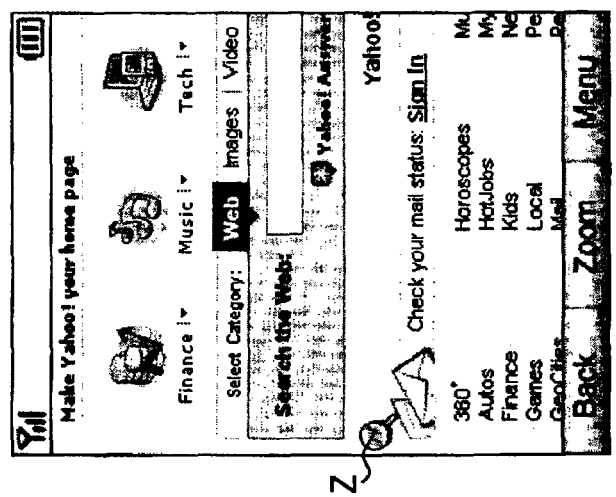
Figure 5:
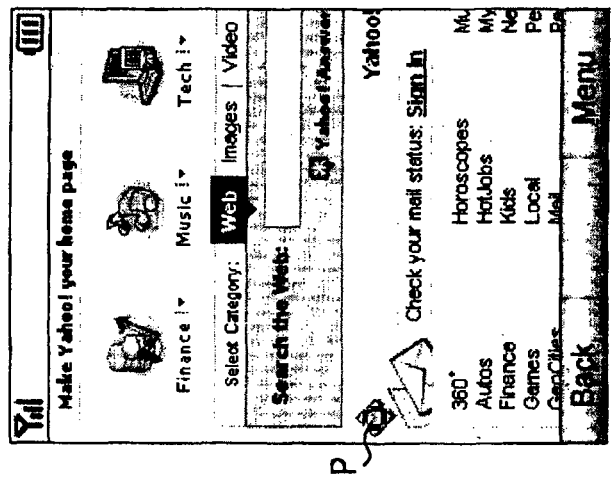
Figure 13:
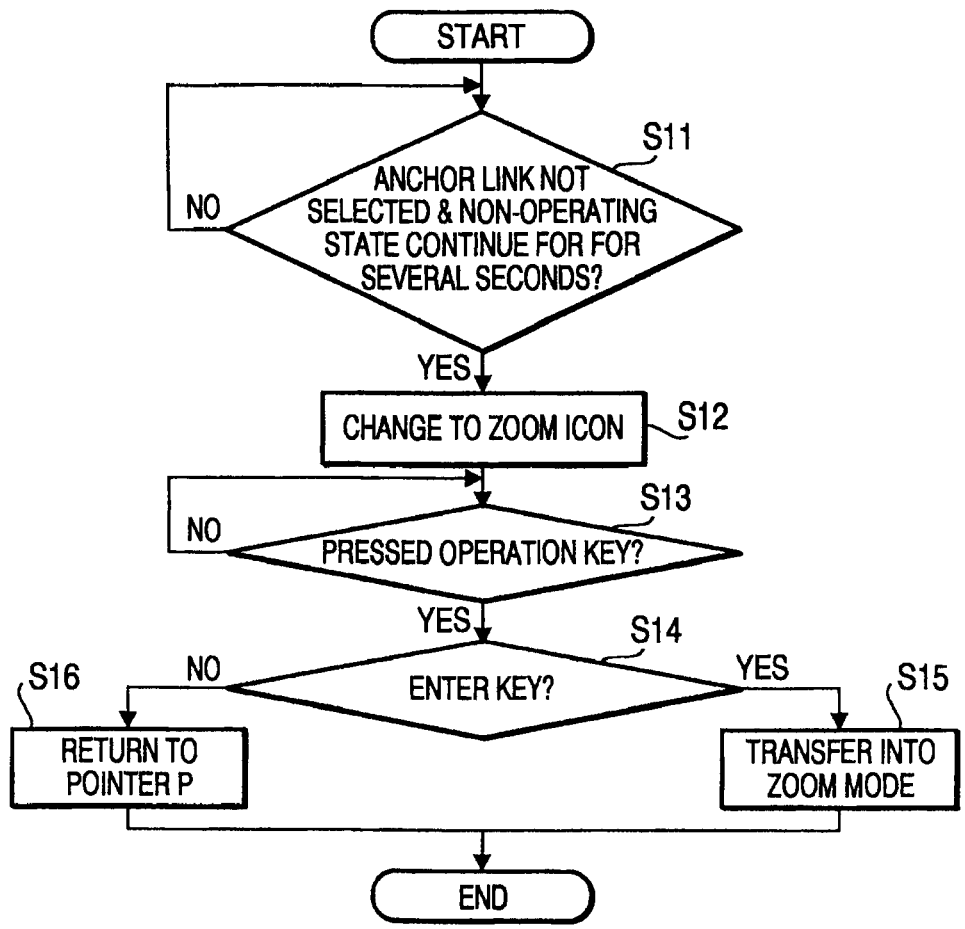
FIG. 13 is a flowchart showing a process upon transferring into a "zoom mode" according to an embodiment of the invention.

FIGS. 5(a)-(c) show examples of a page displayed in the browser 50. Further, FIG. 13 shows a flowchart of a process when transferring from pointer mode into another mode (Herein, "zoom mode".). FIG. 5(a) shows a pointer mode. In the pointer mode, in a situation when neither of the anchor links is set focus on, if a duration period of several seconds (e.g., one second) when no input of user operation was detected, had passed (S11: YES), the browser 50 changes the pointer P to a zoom icon Z (S12). Simultaneously with this process, it captions "Zoom" in the lower center button in the screen. When the user pressed the enter key 117E at this situation (S13: YES, S14: YES), the browser 50 transfers from the pointer mode into the zoom mode (S15).

It is noted that, when an operation key other than the enter key 117E was pressed while the zoom icon Z had been displayed (S13: YES, S14: NO), the browser 50 returns the zoom icon Z to the pointer P (S16). Further, according to a setting by user operation, even if it was in a state when either of the anchor links was set the focus on, it may be arranged to operate such that the pointer P would be changed to the zoom icon Z if the above described period continued for several seconds.

In other words, according to the browser 50 of the embodiment of the invention, if a state where no user operation input had been detected continued for a predetermined period, it transfers into a predetermined mode ("pointer mode" in this case.). Alternatively, an icon for selection for transferring from the current mode into another mode ("zoom icon Z" in this case.) is displayed. That is, according to the embodiment of the invention, for example, the selection operation for menu items for transferring into another mode is not needed, and the user load is reduced.

It is noted that, if the period when there was no user operation input detected continued for several seconds, instead of changing the pointer P to the zoom icon Z, it may transfer from the pointer mode into the zoom mode directly. In this case, a step for pressing the enter key 117E is eliminated, and thereby, the operation load of the user will be reduced.

FIG. 5(c) shows the zoom mode. In the zoom mode, the browser 50 displays an indicator I at front side in a page. Further, simultaneously, buttons in lower center and lower left in the screen are captioned "OK" and "Cancel", respectively.

Figure 6:
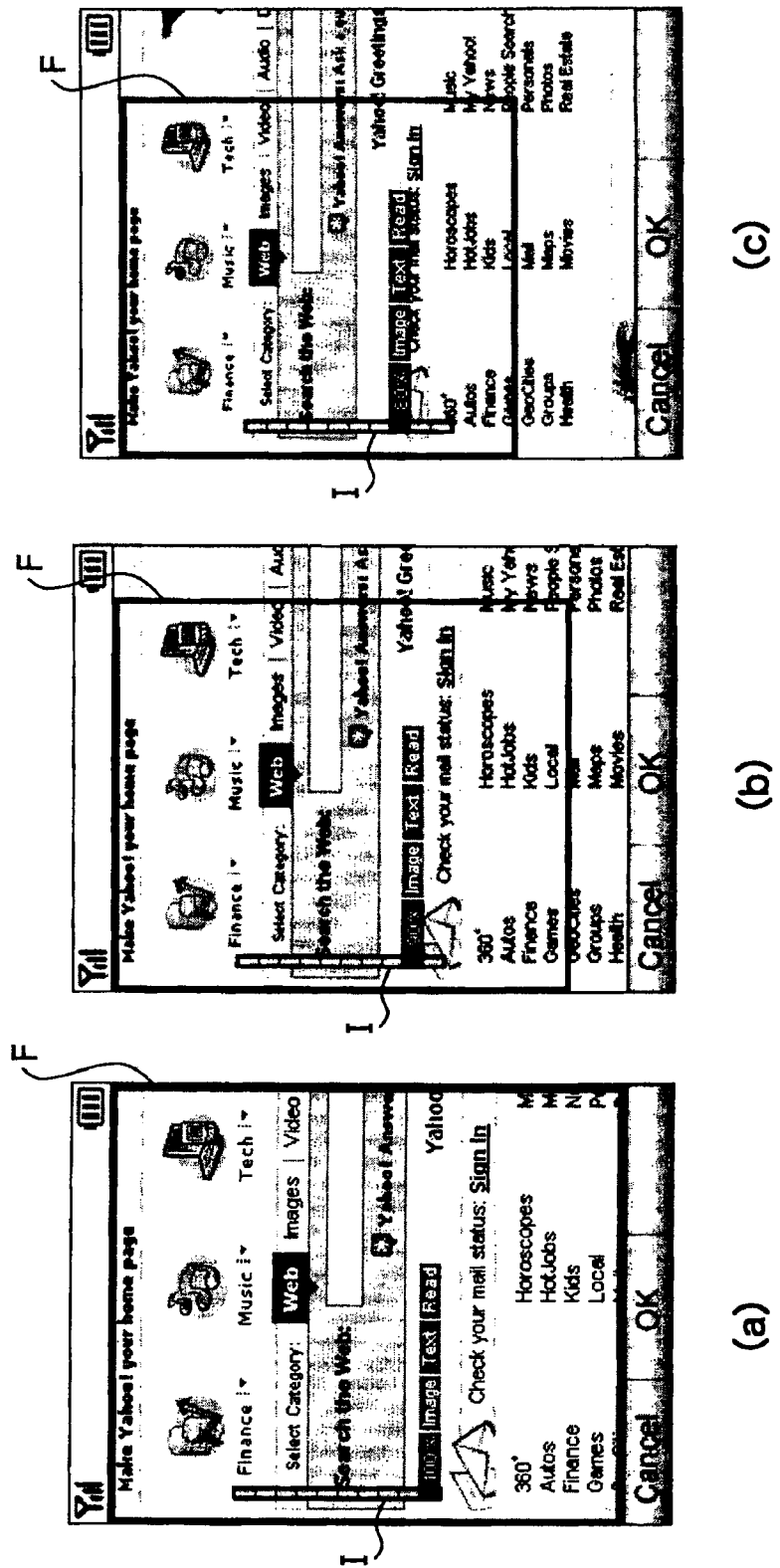
FIG. 6 is diagram showing an example of a page displayed in the "zoom mode" according to an embodiment of the invention.

FIGS. 6(a)-(c) show an example of the zoom mode. The indicator I comprises a plurality of icons lined up in rows, respectively, in longitudinal and lateral directions. When it transferred into the zoom mode, initially, the lowermost icon of the indicator I is displayed in a different color compared with other icons, as shown in FIG. 6(a). In other words, the lowermost icon is in a state of drawing attention. By pressing a direction key 117U or 117D, the user is able to change the icon in a state of drawing attention in the longitudinal direction.

As shown in FIG. 6(a), at the side of the icon in a state of drawing attention (right side of the indicator I), "100%", "Image", "Text" and "Read" icons are lined up in a row to be displayed. Among these icons, "100%" icon is in a state of drawing attention. The "100%" icon is an icon for determining the displaying zoom/pan ratio for the page. When the enter key 117E was pressed when the "100%" icon was in a state of drawing attention, the browser 50 displays the page in unchanged zoom/pan ratio. That is, it displays the page in same zoom/pan ratio compared to FIGS. 4 and 5. Further, the browser 50 displays the page in the unchanged zoom/pan ratio initially. Therefore, even if the user pressed the enter key 117E initially after transferring into the zoom mode, the displaying zoom/pan ratio for the page does not change.

By pressing the direction key 117R or 117L, the user is able to change the icon in a state of drawing attention in the lateral direction. When the icon was changed with such operation, the browser 50 displays the page in a mode corresponding to the icon in a state of drawing attention (e.g., "Image", "Text" and "Read" icons). For example, the mode corresponding to the "Image" icon is a mode that displays only images, and a mode corresponding to the "Text" icon is a mode that displays only text. It is noted that such modes are not limited to modes shown in the embodiment of the invention and various kind of modes may be possible.

When the direction key 117U was pressed once in FIG. 6(a), the browser 50 changes the icon in a state of drawing attention in the indicator I to an icon one-step upwards. In this stage, "90%", "Image", "Text" and "Read" icons are displayed at the side of the indicator I. Further, the "90%" icon is in a state of drawing attention. When the enter key 117E was pressed in this situation, the browser 50 displays the page in 90% zoom/pan ratio. In this case, text and images become smaller compared with the display in the unchanged zoom/pan ratio, and although the visibility becomes a bit poor, it has an advantage in that the displaying area becomes broader.

When the direction key 117U was pressed once in FIG. 6(b), the browser 50 changes the icon in a state of drawing attention at the indicator I to one step further upwards. In this stage, "80%", "Image", "Text" and "Read" icons are displayed at the side of the indicator I. Further, the "80%" icon is in a state of drawing attention. When the enter key 117E was pressed in this situation, the browser 50 displays the page in 80% zoom/pan ratio. In this case, text and images become smaller compared with the display in FIG. 6(b), and although the visibility becomes a bit poor, it has an advantage in that the displaying area becomes further broader.

When the function key F1 was pressed in the zoom mode, the browser 50 returns to the pointer mode from the zoom mode. In other words, the indicator I is cleared and the pointer P is displayed.

As shown in FIGS. 6(a)-(c), the browser 50 displays a displaying area frame F superposed on the page. The displaying area frame F has a size that surrounds the whole displaying area of the display 113 for a situation when the page is displayed in the unchanged zoom/pan ratio, as shown in FIG. 6(a). In other words, the displaying area frame F represents the displaying area during the display with unchanged zoom/pan ratio. Therefore, when the page is displayed in reduced zoom/pan ratio, such as 90% or 80%, the displaying size of the displaying area frame F becomes smaller compared to the displaying area of the display 113, as shown in FIGS. 6(b) and (c). By looking at the displaying size of the displaying area frame F compared to the displaying area of the display 113, the user is able to recognize the degree of current displaying zoom/pan ratio visually and in a natural sense.

FIGS. 7(a) and (b) also show an example of the zoom mode. When the direction key 117U was pressed six times (or, continued to be pressed) from the situation in FIG. 6(c), the browser 50 changes the icon in a state of drawing attention at the indicator I six step further upwards, as shown in FIG. 7(a). In this stage, "Fit", "Image", "Text" and "Read" icons are displayed at the side of the indicator I. Further, the "Fit" icon is in a state of drawing attention. When the enter key 117E was pressed in this situation, based on the information of the width of the displaying area of the display 113 and the width of the page (the information acquired from the parsed result of the parser 31), the browser 50 displays the page in zoom/pan ratio in which those widths become the same. That is, the page is displayed so that the width of the page fits the whole width of the displaying area of the display 113.

When the direction key 117U was pressed once in FIG. 7(a), the browser 50 changes the icon in a state of drawing attention at the indicator I one step further upwards, as shown in FIG. 7(b). In this stage, "History" icon is displayed at the side of the indicator I. Further, the "History" icon is in a state of drawing attention. When the enter key 117E was pressed in this situation, the browser 50 operates together with the CPU 103 and search in the RAM 107 to acquire history data.

The history data will be described now. When the page was acquired, the browser 50 operates together with the CPU 103 and captures the page as one sheet of an image. Then, the captured image is stored in the RAM 107 as the history data. In this stage, each of the images is associated with information for a URL of the corresponding page and a time displayed in the display 113.

As shown in FIG. 7(b), the browser 50 displays the image of the currently displaying page among those in acquired history data in center of the display 113. (Hereinafter, this page is described "center page" for the benefit of simplicity.) At the right side of the center page, a part of image of a page that was displayed next in the display 113 is displayed. Each of the images is lined up in time sequence based on time information associated with each of them. It is noted that the history data is not limited to the captured image and it may be, for example, data for the page itself. In this case, a plurality of pages is displayed simultaneously.

The browser 50 assumes the center page as a page in the state of drawing attention in FIG. 7(b). By pressing the direction key 117R or 117L, the user is able to switch the center page. Further, every time the direction key 117R was pressed, the center page is switched to a page that was displayed next to the displaying page. Furthermore, every time the direction key 117L was pressed, the center page is switched to a page that was displayed one prior to the displaying page. When the enter key 117E was pressed, the browser 50 sends a request to a URI associated with the image of the currently displaying center page. Then, the center page is displayed, for example, with the form shown in FIG. 4(a) (i.e., in unchanged zoom/pan ratio).

Thus, according to the embodiment of the invention, the user is enabled to perform a switching operation of the displaying form of the page by using the indicator I. Specifically, the user is able to change the displaying zoom/pan ratio of the page or to display the history, with performing only simple operation of changing the longitudinal location in the state of drawing attention and selecting it. Further, the displaying form of the page can be changed with performing only simple operation of selecting an icon displayed together with the indicator I and lined up in lateral direction from the indicator I. That is, according to the embodiment of the invention, the switching between various kinds of displaying forms is accomplished by means of user operation utilizing the indicator I consisting of icons for different purposes (purposes for displaying zoom/pan ratio for the longitudinal axis and displaying mode for the lateral axis) allocated in arrays in two axes, respectively.

In the following, the operation of the browser 50 for a page including a frame will be described. Such a page consists of, for example, a HTML document (Hereinafter, it is described "frame document" for the benefit of simplicity.) in which division-displaying the page with a menu page, a content page and the frame was defined using, for example, "frameset" tags. Hereinafter, a set of those pages is described "frame page" for the benefit of simplicity.

The menu page and the content page are pages divided with the frame defined in the document for frame to be displayed. The menu page is, for example, a page in which a plurality of anchor links with captions such as menu items is put into a layout. The content page is a page in which text and images, etc., representing specific content of the page are put into a layout.

FIGS. 8(a)-(c) shows an example of the frame page. The frame page is a page in which a menu page M and the content page C were divided by a frame longitudinal in vertical direction to be displayed. As with the above examples, this frame was created assuming the display of, for example, desktop PCs. Therefore, as shown in FIG. 8(a), they are not fit in the displaying area of the display 113, and only a part is displayed.

Initially, the browser 50 performs a process such as formatting so that all pages of a frame page are displayed. The pages to be displayed in the present embodiment of the invention are two pages, which are the menu page M, and the content page C. Therefore, as shown in FIG. 8(a), the browser 50 displays the content page C in right half and the menu page in left half so that the displaying area of the display 113 is divided into two parts with the frame.

When user operation was not performed for certain period of time as is with the above example, the zoom icon Z is displayed, as shown in FIG. 8(a). When the enter key 117E was pressed in this situation, the browser transfers into the zoom mode and displays an indicator I', as shown in FIG. 8(b). The indicator I' is different from the above described indicator I, and is an indicator for the frame page. Since the HTML document is parsed by the parser 31, the browser 50 knows in advance whether a page includes a frame document or not (i.e., whether it is a frame page or not). Therefore, based on such known information, the browser 50 is able to display the indicator I' only when the page includes a frame document.

The indicator I' is made of a plurality of icons each lined up in a longitudinal and a lateral directions, as with the indicator I. The difference between those indicators is only one point, and that is, the indicator I' is displayed with "displaying zoom/pan ratio (e.g., 100%)", "(an icon without a caption) (Hereinafter, it is described "frame-informing icon")", "Image", "Text" and "Read" icons, lined up at the side of the icon in the state of drawing attention (right side of the indicator I'), as shown in FIG. 8(b).

When the direction key 117R was pressed once in FIG. 8(b), the browser 50 changes the icon in a state of drawing attention from "100%" icon to the frame-informing icon. When the enter key 117E was pressed in this situation, the browser 50 moves the frame-informing icon to the left side of the indicator I'. Simultaneously, based on information of width of the displaying area of the display 113 and the width of the menu page M (or location information of the frame), the menu page M is displayed in zoom/pan ratio in which those widths become the same. In other words, among the menu page M and the content page C, only the menu page M is displayed. It is noted that, information of the width for the menu page M is acquired from the parsed result carried out by the parser 31.

Figure 8:
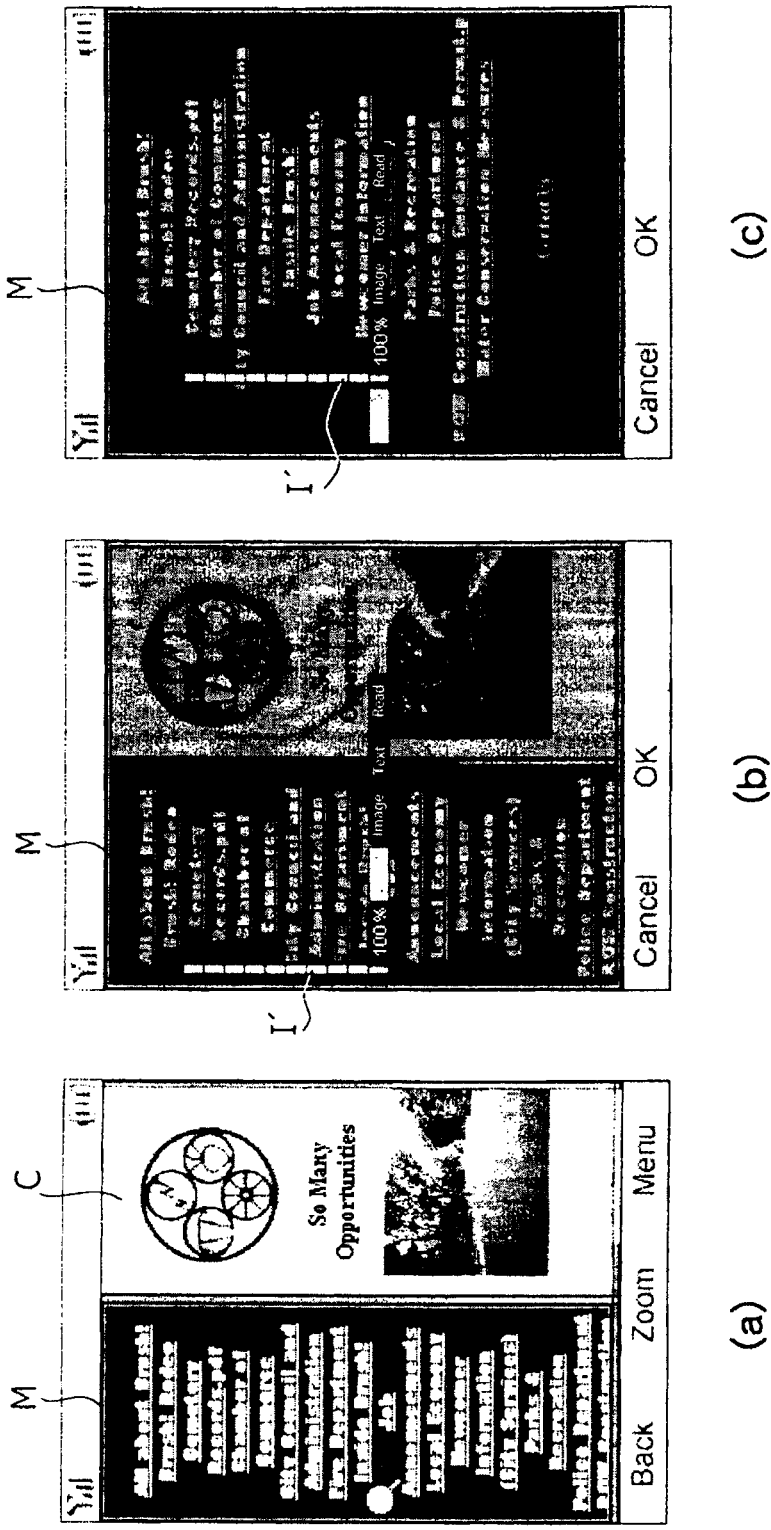
FIG. 8 is a diagram showing an example of a frame page displayed in a browser according to an embodiment of the invention.

When there was the frame-informing icon at right side of the indicator I', the browser 50 displays all pages in the frame page, as shown in FIG. 8(*b*). In contrast, when there was the frame-informing icon at left side of the indicator I', the browser 50 displays a single page in the frame page. By looking at the location of the frame-informing icon, the user is able to recognize the page-displaying form visually and intuitively. The user may set at his/her discretion, for example, by user operation, which page should be displayed in a situation when there was the frame-informing icon at left side of the indicator I'.

Embodiments of the invention are described in the above. However, the present invention is not to be limited to those embodiments and various modifications are possible. For example, the page (e.g., HTML document) was used in the embodiment of the invention but electronic documents with PDF (Portable Document Format) format may be used to perform processes such as display mode switching and zoom/pan ratio setting, in another embodiment of the invention.

According to another embodiment of the invention, each time a state in which input by user operation was not detected continued for certain period of time, the browser 50 switches the icon-for-selecting for the user to transfer into a desired mode to be displayed according to a predetermined procedure. Specifically, each time certain period continues, the browser 50 switches to and displays the icon-for-selecting, in the order: the pointer P, the zoom icon Z, an icon for another mode, and an icon for yet another mode, . . . When the display for all of the icons for selecting was done, the pointer P is displayed again, and thereafter, the switching display of the icon-for-selecting is repeated in the same order.

In such a case, the user waits until the icon-for-selecting is switched to be the one for transferring into a desired mode. When the icon-for-selecting switched to the desired one, by pressing the enter key 117E, the browser 50 transfers into the mode that the user desires. In other words, the user is able to transfer the browser 50 into a desired mode among a plurality of modes, with a simple operation by just pressing the enter key 117E once.

Figure 7:
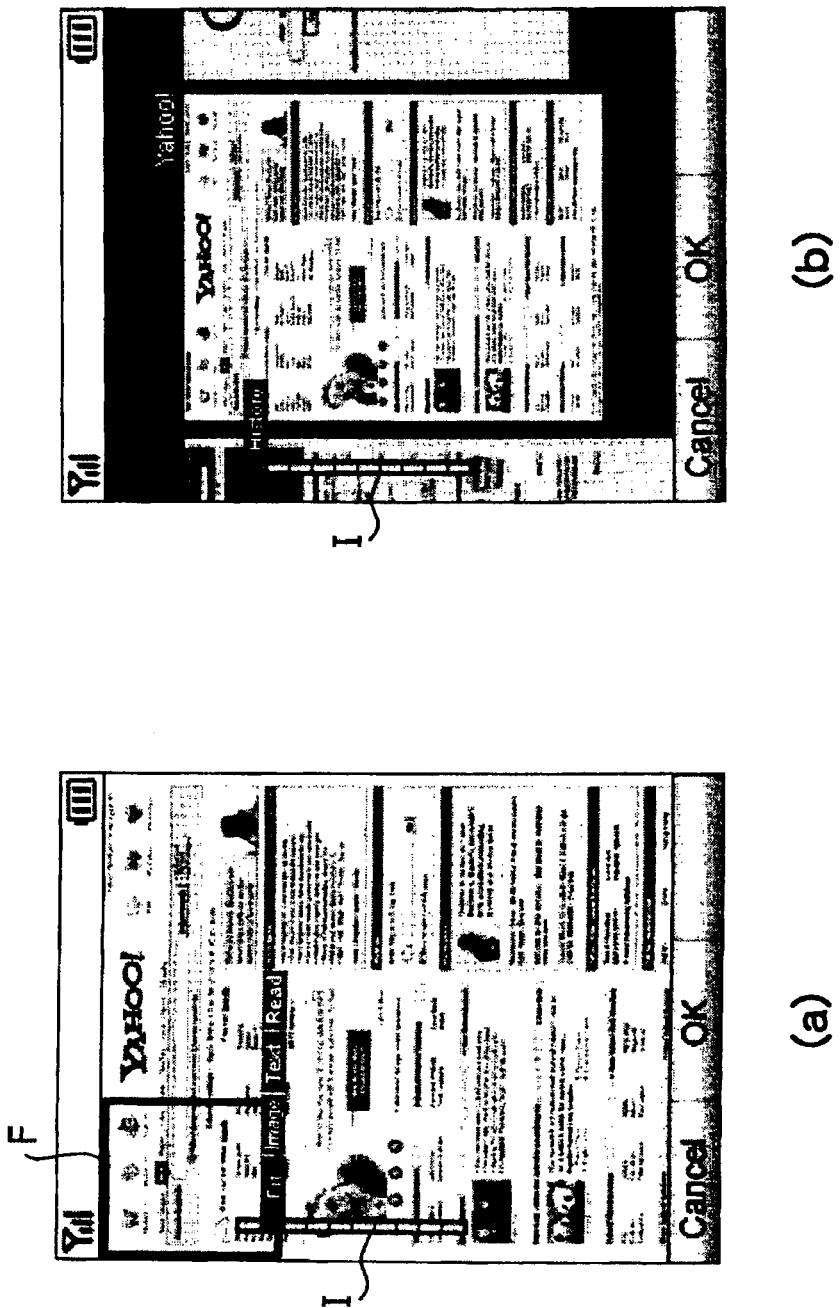
FIG. 7 is a diagram showing an example of a page displayed in the "zoom mode" according to an embodiment of the invention.
Figure 9:
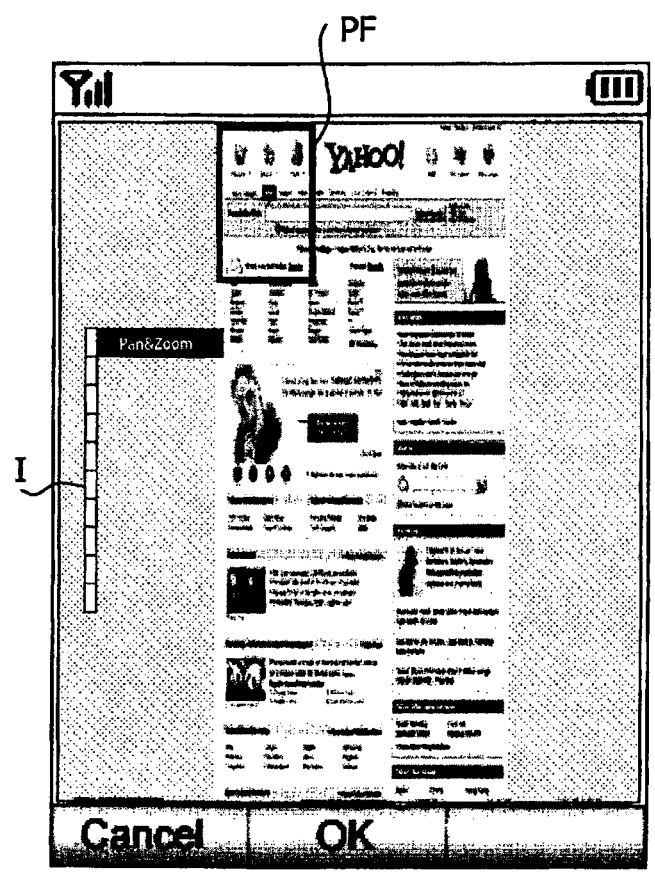
FIG. 9 is a diagram showing an example of a page displayed in the "zoom mode" according to an embodiment of the invention.

In yet another embodiment of the invention, "Pan & Zoom" icon may be used as an alternative to the "History" icon in FIG. 7(*b*). FIG. 9 shows an example of the display in the browser 50 implemented with the "Pan & Zoom" icon. As shown in FIG. 9, when the "Pan & Zoom" icon turned into the state of drawing attention, a whole page of, for example, a vertically-long page (i.e., page with dimension that requires scrolling in vertical directions), is displayed on one screen by reducing size, as well as the frame for panning PF is superposed on the zoomed out page. When the user pressed the four-way key in this displaying situation, the frame for panning PF moves in the zoomed out page according to the pressed key. Then, when the enter key 117E was pressed (or when certain period continued in a non-operated state after the frame for panning stopped moving), an area surrounded by the frame for panning PF is enlarged in the whole screen (More precisely, in unchanged zoom/pan ratio as in FIG. 4.). In other words, according to the example of "Pan & Zoom", the user is able to recognize the whole page visually and select directly the area preferring to browse in the page, and to immediately display the area in a size easily recognizable visually and to browse it.

Figure 10:
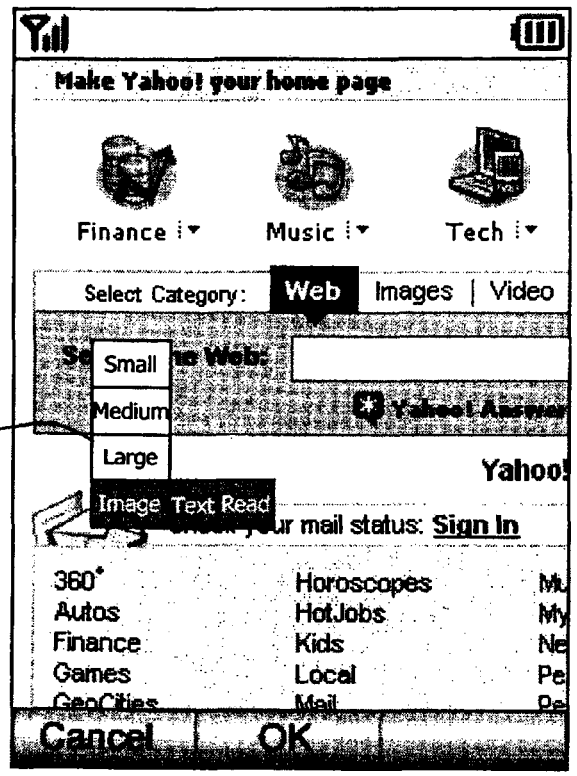
FIG. 10 is a diagram showing an example of a page displayed in a browser according to an embodiment of the invention.
Figure 10:
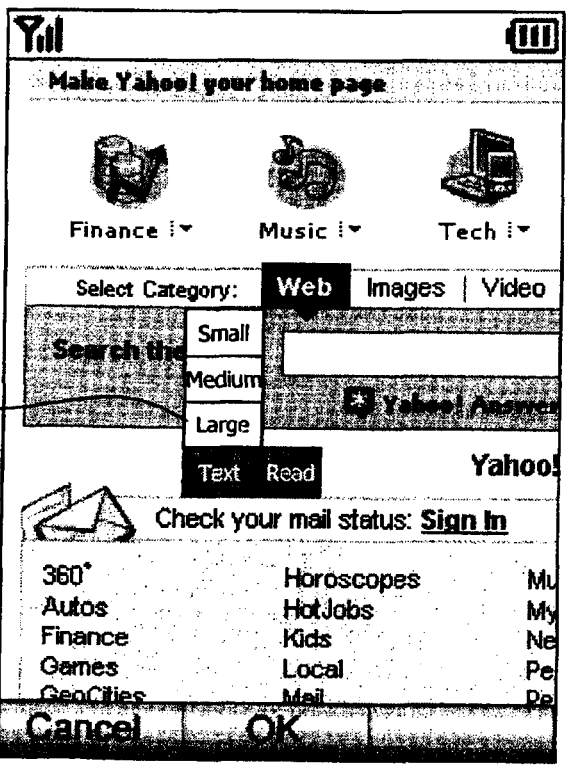

In yet another embodiment of the invention, by performing operations for the indicator I, it is able to perform parameter settings for the modes corresponding to, for example, "Image", "Text" and "Read" icons. For example, as shown in FIG. 10(*a*), when the icon in a state of drawing attention changes from "100%" icon to "Image" icon, the browser 50 clears the "100%" icon and arranges the indicator I further with "Small", "Medium" and "Large" icons, and moves and displays them above the "Image" icon. The "Small", "Medium" and "Large" icons represent parameters (e.g., image size) that can be set in the "Image" icon mode. By selecting either of the "Small", "Medium" and "Large" icons, the displaying size for images in the mode can be set in user's discretion. Further, FIG. 10(*b*) shows a similar example with FIG. 10(*a*). In accordance with the example in FIG. 10(*b*), when the icon in a state of drawing attention changes from "Image" icon to "Text" icon, the browser 50 clears the "Image" icon and arranges the indicator I further with "Small", "Medium" and "Large" icons, and moves and displays them above the "Text" icon. The "Small", "Medium" and "Large" icons represent parameters (e.g., image size) that can be set in the "Image" icon mode. By selecting either of the "Small", "Medium" and "Large" icons, the displaying size for text in the "Text" icon mode can be set in user's discretion. Thus, in this embodiment of the invention, the indicator I enables to perform the parameter setting for each modes.

Figure 11:
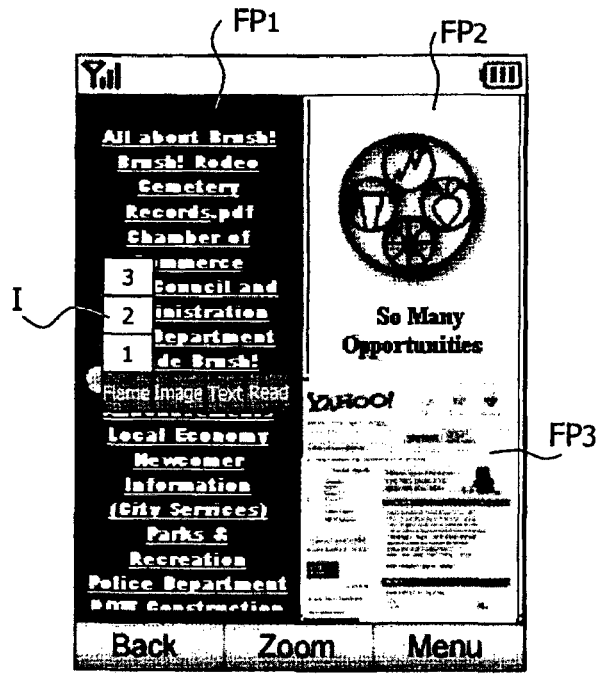
FIG. 11 is a diagram showing an example of a frame page displayed in a browser according to an embodiment of the invention.

Further, there is another embodiment of the invention for processing the frame page. According to the embodiment of the invention, for example, "Frame" icon is displayed as an alternative for the frame-informing icon of FIG. 8(*b*), as shown in FIG. 11. In the example in FIG. 11, the browser 50 is in a state after accessing a frame page that division-displays three pages with the frame. In this case, when the icon in a state of drawing attention was changed from "100%" icon to "Frame" icon, the browser 50 clears the "100%" icon and further arranges the indicator I with "1", "2" and "3" icons, and moves and displays it above the "Frame" icon. Further, based on the parsed result from the parser 31, the browser 50 recognizes that the frame page in FIG. 11 includes n number (three in this case) of pages, and assigns the numbers, "1", "2", "3", . . . , for example, in the parsed order. In this case, for example, "1", "2", and "3" are assigned to the left page FP1, upper right page FP2, and lower right page FP3 in the screen, respectively. When the "Frame" icon changed to the state of drawing attention, as described in the above, the indicator is arranged to include icons representing the pages in the frame page, i.e., "1", "2" and "3" icons. Each of the "1", "2" and "3" icons is arranged as a link to the associated page, and for example, when "1", "2" and "3" icons were selected, the pages FP1, FP2, and FP3 are displayed in the whole screen, respectively. In other words, with a simple operation that selects an icon in the indicator I, the user is able to display a desired page in the frame page and browse with good visibility.

In yet another embodiment of the invention, the display 113 may comprise a touch panel. In this case, the user is able to operate intuitively, for example, the pointer P, the zoom icon Z, and the indicator I, with, for example, touching with a finger and pen-touching with a stylus. Further, for example, when a portion in the display was tapped, it may be arranged so that the pointer P, the zoom icon Z, and the indicator I, etc., are displayed to be transferred into their respective modes.

According to the present invention, a terminal apparatus capable of reducing the operation load of the user is provided. Further, a content displaying method and a content displaying program suitable for reducing the operation load of the user are provided.

What is claimed is:

1. A terminal apparatus for analyzing content data and displaying content on a display screen based on the analyzed result, comprising:

an operation unit that accepts input operation of a user;
a non-operation detecting unit that detects whether a non-operating state of the operation unit has continued for a predetermined period or not; and
a pointer displaying unit adapted to control a display of a pointer on the display screen,
wherein the pointer is movable in accordance with the user input operation through the operation unit, and
wherein the pointer displaying unit starts to display the pointer on the display screen when it is detected that the non-operating state has continued for a predetermined period.

2. The terminal apparatus according to claim 1,
wherein the pointer displaying unit is further adapted to display the pointer in a first mode, and
wherein the pointer is for selecting an anchor link included in the content; and the terminal apparatus further comprises:
a pointer location monitoring unit adapted to monitor a location of the pointer; and
a proximity determining unit adapted to determine whether the pointer comes in proximity to the anchor link or not, based on the monitoring result of the pointer location monitoring unit and the analyzed result;
and wherein, when it is determined that the pointer comes in proximity to the anchor link, the anchor link is set focus on.

3. The terminal apparatus according to claim 2, wherein the non-operation detecting unit does not perform a detecting process while the focus is set on.

4. The terminal apparatus according to claim 2, wherein:
the pointer displaying unit is adapted to display a second mode transferring icon for transferring from the first mode to a second mode, when the non-operation detecting unit detects that the non-operating state has continued for a predetermined period while in the first mode; and
the terminal apparatus transfers into the second mode when the operation unit performs selection operation for the second mode transferring icon.

5. The terminal apparatus according to claim 4, further comprising an indicator displaying unit adapted to display in the second mode, an indicator that allocates in a first direction in array a plurality of zoom/pan ratio setting icons for setting displaying zoom/pan ratio for the content and which allocates in a second direction in array a plurality of mode-setting icons for setting the mode.

6. The terminal apparatus according to claim 5, wherein the first direction and the second direction are perpendicular to each other.

7. The terminal apparatus according to claim 5, wherein the indicator displaying unit displays all of the zoom/pan ratio setting icons all the time in the second mode, and displays in a line the mode-setting icons adjacent to the zoom/pan ratio setting icon that is in a state of drawing attention among the zoom/pan ratio setting icons.

8. The terminal apparatus according to claim 5, further comprising a displaying area superposing unit that superposedly displays onto the content in the second mode, displaying area information that represents the displaying area when the displaying zoom/pan ratio of the content is unchanged zoom/pan ratio.

9. The terminal apparatus according to claim 5, further comprising a content width information acquiring unit adapted to acquire content width information based on the analyzed result,
wherein when selection operation for a first zoom/pan ratio setting icon among the plurality of zoom/pan ratio setting icons is performed, the content is displayed in zoom/pan ratio in which the width of the content and the width of the displaying area of the display becomes the same.

10. The terminal apparatus according to claim 5, further comprising a content capturing unit adapted to capture each of the content displayed in the display and for storing it associating with its displayed time information,
wherein when a second zoom/pan ratio setting icon is selected among the plurality of zoom/pan ratio setting icons, each of the captured content is displayed while being located in time sequence based on the displayed time information.

11. The terminal apparatus according to claim 5, further comprising a frame determining unit adapted to determine whether the content is frame content or not based on the analyzed result,
wherein when it is determined that the content is frame content, the indicator displaying unit allocates in an array an informing icon that informs as such in the second direction of the indicator.

12. The terminal apparatus according to claim 11, further comprising a frame changing unit adapted to change the displaying form of the frame content, when the location of the informing icon is moved with operation using the operation unit.

13. The terminal apparatus according to claim 5, further comprising:
a whole displaying unit adapted to display the whole content on one display screen by reducing size;
an area selecting unit adapted to select an arbitrary area in the zoomed out content; and
an area enlarging unit adapted to enlarge the selected area spreading over a substantially whole area of the display.

14. The terminal apparatus according to claim 5, wherein when selection operation for either of the plurality of mode-setting icons is performed, the indicator displaying unit displays in array in the second direction, icons for setting parameter in the mode corresponding to the selected mode-setting icon.

15. A content displaying method for analyzing content data and displaying content on a display screen based on the analyzed result, comprising:
an operating step of accepting input operation of a user;
a non-operation detecting step of detecting whether a non-operating state in the operating step has continued for a predetermined period or not; and
a pointer displaying step of displaying a pointer on the display screen,
wherein the pointer is movable in accordance with the user input operation through the operation unit,
wherein the pointer displaying step starts to display the pointer on the display when it is detected that the non-operating state has continued for a predetermined period.

16. The content displaying method according to claim 15,
wherein the pointer displaying step displays the pointer in a first mode,
wherein the pointer is for selecting an anchor link included in the content; and the method further comprising:
a pointer location monitoring step of monitoring a location of the pointer; and
a proximity determining step of determining whether the pointer came in proximity to the anchor link or not, based on the monitoring result of the pointer location monitoring step and the analyzed result, wherein when it is determined that the pointer comes in proximity to the anchor link, the anchor link is set focus on.

17. The content displaying method according to claim 16, wherein the detecting process in the non-operation detecting step is not performed while the focus is set on.

18. The content displaying method according to claim 16, wherein:

a second mode transferring icon for transferring from the first mode to a second mode is displayed in the icon displaying step, when the non-operating state continuing for a predetermined period while in the first mode is detected; and the method transfers into the second mode when selection operation for the second mode transferring icon is performed.

19. The content displaying method according to claim 18, further comprising an indicator displaying step of displaying in the second mode, an indicator that allocates in a first direction in array a plurality of zoom/pan ratio setting icons for setting displaying zoom/pan ratio for the content and which allocates in a second direction in array a plurality of mode-setting icons for setting the mode.

20. The content displaying method according to claim 19, wherein in the indicator displaying step, all of the zoom/pan ratio setting icons are displayed all the time, and the mode-setting icons are displayed in a line adjacent to the zoom/pan ratio setting icon that is in a state of drawing attention among the zoom/pan ratio setting icons.

21. The content displaying method according to claim 19, further comprising a displaying area superposing step of superposedly-displaying onto the content in the second mode, displaying area information that represents the displaying area when the displaying zoom/pan ratio of the content is unchanged zoom/pan ratio.

22. The content displaying method according to claim 19, further comprising a content width acquiring step of acquiring content width information based on the analyzed result, wherein when selection operation for a first zoom/pan ratio setting icon among the plurality of zoom/pan ratio setting icons is performed, the content is displayed in zoom/pan ratio in which the width of the content and the width of the displaying area of the display becomes the same.

23. The content displaying method according to claim 19, further comprising a content capturing step of capturing each of the content displayed in the display and of storing it associating with its display time information, wherein when a second zoom/pan ratio setting icon is selected among the plurality of zoom/pan ratio setting icons, each of the captured content is displayed locating in time sequence based on the display time information.

24. The content displaying method according to claim 19, further comprising a frame determining step of determining whether the content is frame content or not based on the analyzed result, wherein when it is determined that the content is frame content, an informing icon informing as such is allocated in an array in the second direction of the indicator.

25. The content displaying method according to claim 24, further comprising a frame changing step of changing the displaying form of the frame content, when the location of the informing icon is moved.

26. The content displaying method according to claim 25, wherein in the frame changing step, a plurality of content included in the frame content is displayed when the informing icon is in a first location, and single content included in the frame content is displayed when the informing icon is in a second location that is located opposite side of the indicator to the first location.

27. The content displaying method according to claim 19, further comprising:

a whole displaying step of displaying the whole content on one screen by reducing size;

an area selecting step of selecting an arbitrary area in the zoomed out content; and an area enlarging step of enlarging the selected area in substantially whole display.

28. The content displaying method according to claim 19, wherein when selection operation for either of the plurality of mode-setting icons is performed, icons for setting parameter in the mode corresponding to the selected mode-setting icon are displayed in an array in the second direction.

29. A non-transitory computer readable medium having computer readable instructions stored thereon, which, when executed by a processor of a computer, configures the processor to perform:

an operating step of accepting input operation of a user;

a non-operation detecting step of detecting whether a non-operating state in the operating step has continued for a predetermined period or not; and a pointer displaying step of causing a display of a pointer on a display screen, wherein the pointer is movable in accordance with the user input operation through the operation unit, and wherein the pointer displaying step causes the display of the pointer on the display screen when it is detected that the non-operating state continued for a predetermined period.

* * * * *